United States Patent [19]

Weiss et al.

[11] 4,176,938
[45] Dec. 4, 1979

[54] ROLL FILM CASSETTE

[75] Inventors: Rudolf Weiss, Grünwald; Werner Kiessling, Unterhaching; Otto Wiedemann, Starnberg, all of Fed. Rep. of Germany

[73] Assignee: Agfa-Gevaert AG, Leverkusen, Fed. Rep. of Germany

[21] Appl. No.: 922,740

[22] Filed: Jul. 7, 1978

[30] Foreign Application Priority Data

Jul. 11, 1977 [DE] Fed. Rep. of Germany ... 7721745[U]

[51] Int. Cl.² ............................................. G03B 17/26
[52] U.S. Cl. ................................................. 354/275
[58] Field of Search .............. 354/203, 213, 216, 275; 352/126, 128; 96/201

[56] References Cited

U.S. PATENT DOCUMENTS 3,227,058  1/1966  Hochreiter ........................... 354/275
3,745,899  7/1973  Walther ............................... 354/213

FOREIGN PATENT DOCUMENTS 2139876  2/1972  Fed. Rep. of Germany .......... 354/275

Primary Examiner—L. T. Hix
Assistant Examiner—Thomas H. Tarcza
Attorney, Agent, or Firm—Michael J. Striker

[57] ABSTRACT

A roll film cassette has a film storage chamber and a film take-up chamber; these are connected by a web along which the film moves as it travels from the storage chamber to the take-up chamber. The web is provided adjacent the inlet to the take-up chamber with a springy detent a projection of which rides on the film and snaps into a perforation formed adjacent the film end in the film and/or in an end paper of the same. This prevents the film end from slipping into the take-up chamber and becoming inaccessible.

7 Claims, 3 Drawing Figures

ROLL FILM CASSETTE

BACKGROUND OF THE INVENTION

1. Field of the Invention

The invention relates to photographic film packages.

More particularly, the present invention relates to a roll film cassette.

Specifically, the invention relates to a roll film cassette having an arrangement for preventing the trailing film end from slipping into the take-up chamber of the cassette.

2. The Prior Art

It is already known to provide roll film in cassettes having a film supply or storage chamber, a film take-up chamber for exposed film, and a web connecting these chambers. The film is withdrawn from the supply chamber, travels along the web and, after being exposed, enters the take-up chamber in which it is wound up. Each of the chambers contains a spool to which a respective end of the film is connected; sometimes the connection is not made directly but via a leader that is connected to the leading end of the film and to the spool in the take-up chamber, and another leader (an "end paper" or "protective paper") which is connected to the trailing film end and to the spool in the supply chamber.

When the film has been completely exposed and has been taken up in the take-up chamber, it is ready for developing. For this purpose the film must be withdrawn from the take-up chamber and in this connection it is important that the trailing film end not be allowed to slip into the take-up chamber. If it does, the film end becomes inaccessible in the take-up chamber and special measures are then required (including breaking-open of the take-up chamber) to retrieve it. This is time consuming and is to be avoided.

To overcome this problem it has been proposed to form the cassette with a hook-shaped detent which engages in a special perforation provided at the trailing end of the film, to keep this end from slipping into the take-up chamber. However, such cassettes are usually made by injection molding of synthetic plastic material and the formation of the hook-shaped detent necessitates the construction of relatively complicated molds which are correspondingly expensive, a fact that is reflected in the manufacturing cost of the cassettes. Since such cassettes are mass-produced in extremely large series it is, however, desirable that they be as inexpensive as possible.

SUMMARY OF THE INVENTION

Accordingly, it is an object of the invention to overcome the drawbacks of the prior art.

More particularly, it is an object of the invention to provide a roll film cassette of the type under discussion, which is simple to construct than those of the prior art and which is less expensive to produce.

In keeping with these objects, and with others which will become apparent hereafter, one feature of the invention resides in a roll film cassette which, briefly stated, comprises a film supply chamber for unexposed film and having a film outlet; a film take-up chamber for exposed film and having a film inlet; a web connecting the chambers and along which the film travels from the outlet to the inlet; and means on the cassette, including a springy arm having a projection riding on the film and located adjacent to but upstream of the inlet, for engaging in a cut-out proximal to a trailing end of the film when the same approaches the inlet so as to prevent the trailing film end from entering the inlet.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
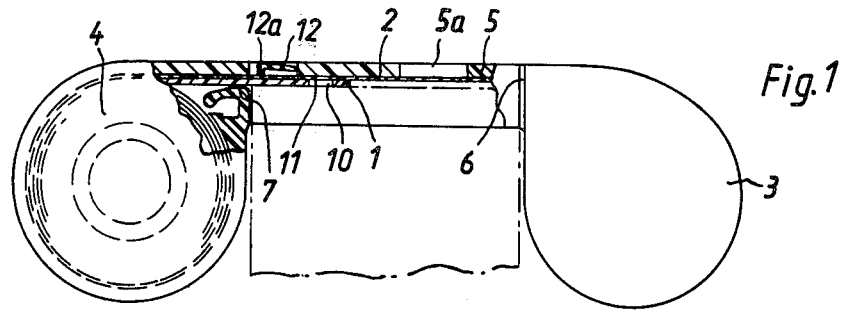
FIG. 1 is a partial section through a roll film cassette embodying the invention, on a line parallel to the direction of film movement and showing the film before it is fully taken up in the take-up chamber.
Figure 2:
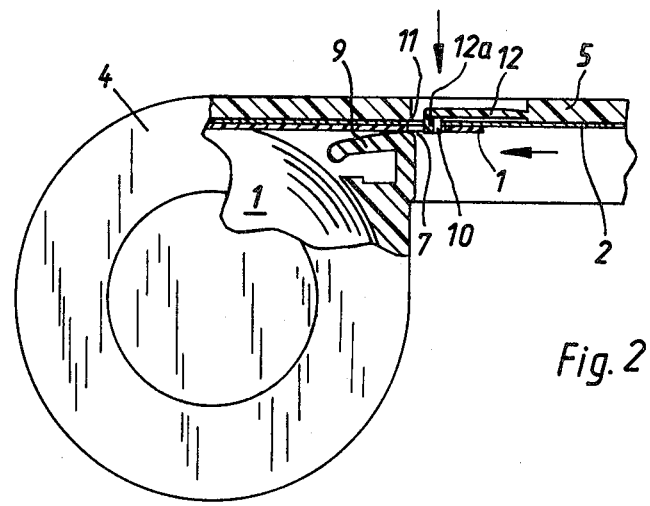
FIG. 2 is an enlarged fragmentary section, showing the take-up chamber and the trailing film end.
Figure 3:
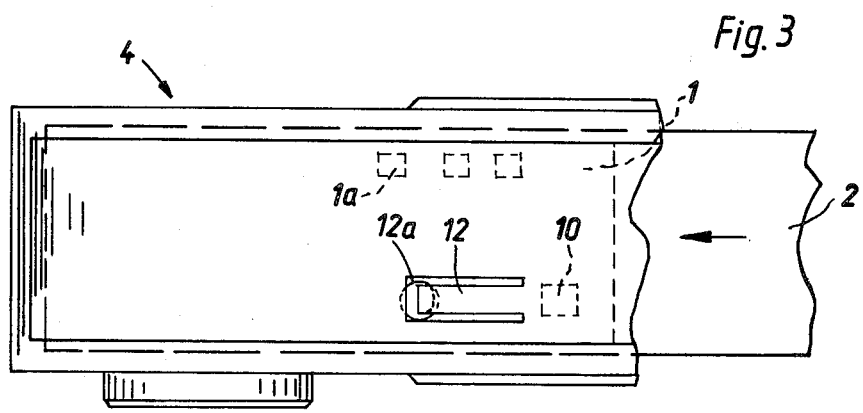
FIG. 3 is a fragmentary, partly broken-away rear elevation of the cassette shown in FIGS. 1 and 2.

An exemplary embodiment of the invention is illustrated in FIGS. 1–3 which show a roll film cassette having a supply or storage chamber 3, a take-up chamber 4 and a web connecting the chambers 3 and 4 with one another. Each of the chambers contains the usual rotatable film spool (not shown in detail). A supply of fresh (not exposed) roll film 1 is wound on the spool in chamber 3; a protective end strip 2 (of paper or the like) is connected to the trailing end of film 1 and wound onto the spool (not shown). The film 1 travels incrementally in the direction of the arrow (FIG. 3) along and in contact with the web 5 every time an exposure is made through the film window 5a of the web; it is then taken up on the spool (shown in broken lines) in the take-up chamber 4. The chamber 3 has an outlet opening 6 and the chamber 4 an inlet opening 7 for the film 1. The inlet 6 and the outlet 7 are each provided with a portion (shown only for inlet 7 in FIGS. 1 and 2) which has a film guiding surface 9 that is curved in direction towards the interior of the respective chamber 3 and 4, respectively.

The end paper strip 2 at the trailing end of the film 1 extends rearwardly beyond the trailing film end so that, when the latter is already very close to the film inlet 7 of chamber 4, the strip 2 still overlies the film window 5a to block the entry of light through the same. Also, since the strip 2 remains in this position until the film is ready to be developed, the strip 2 can be used to pull the film 1 out of the chamber 4 (usually through the film window 5a) for developing purposes.

In accordance with the invention a special arrangement is provided to prevent the trailing film end from slipping through the inlet 7 into the take-up chamber 4, wherein it would otherwise become inaccessible.

The film 1 and the strip 2 which overlaps a trailing portion of the film, are provided adjacent the trailing film end with registering cut-outs 10 and 11. Of course, it would also be possible to omit the cut-out 10 in film 1 and to provide only the cut-out 11 in strip 11, but this cut-out 11 would then evidently need to be located rearwardly of the trailing film end. In any event, the cut-outs 10 and/or 11 are so positioned as to be located laterally away from the ordinary film-transporting perforations 1a (only some shown in FIG. 3) which extend along one or both lateral edges of the film 1.

The web 5 is formed with an arm 12 which is springy and tends to press against the film 1 (see the vertical arrow in FIG. 2) so that a projection 12a of the arm 12 rides on the film surface. The projection 12a is located just ahead of the film inlet 7 and is positioned in the path of movement of the cut-outs 10 and/or 11 so that, when these cut-outs move opposite the projection 12a the same will snap into them and arrest the film 1 against further movement. The trailing film end is then prevented from entering the chamber 4.

The arm 12 with its projection 12a can be produced at the time the cassette is formed by injection molding, in the same operation. Unlike the prior-art hook-shaped detents this arm does not require complicated and expensive multi-partite molds, nor the complicated sequence of relative movements of the parts of such molds. Therefore the cassette according to the invention is simpler and less expensive to produce. Given the fact that such cassettes are mass-produced in the hundreds of thousands or even by the millions, this fact constitutes an important economic advantage.

The invention is susceptible of various modifications which are intended to be embraced by this disclosure and the appended claims. For example, the cut-outs 10, 11 need not be located away from the film perforations. They could be located on a line with one of the rows of perforations and e.g., follow the last perforation in the row. In that case, the cut-outs 10, 11 would be made larger than the perforations and the projection 12a would be so dimensioned that it could enter only into the cut-outs but would be too large to enter into the performations.

While the invention has been illustrated and described as embodied in a roll film cassette, it is not intended to be limited to the details shown, since various modifications and structural changes may be made without departing in any way from the spirit of the present invention.

Without further analysis, the forgoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A roll film cassette, comprising a film supply chamber for unexposed film and having a film outlet; a film take-up chamber for exposed film and having a film inlet; a web connecting said chambers and having a film window across which the film travels in a plane from said outlet to said inlet; and means on said cassette, including a springy arm intermediate said film window and said inlet and normally extending substantially parallel to said plane, said arm having a free end closer to said inlet than to said window and provided with a projection riding on the film for engaging in a cut-out proximal to a trailing end of the film when the same approaches said inlet so as to prevent the trailing film end from entering said inlet.

2. A roll film cassette as defined in claim 1, wherein said arm is provided on said web.

3. A roll film cassette as defined in claim 2, wherein said arm is of one piece with said web.

4. A roll film cassette as defined in claim 1, wherein a trailing end portion of the film has a protective strip connected to it and extending rearwardly beyond the trailing film end, said cut-out being provided in said trailing end portion and the strip being provided with another cut-out in registry with the first-mentioned cut-out.

5. A roll film cassette as defined in claim 1, wherein a trailing end portion of the film has a protective strip connected to it and extending rearwardly beyond the trailing film end, said cut-out being provided in said strip rearwardly of but proximal to said trailing film end.

6. A roll film cassette as defined in claim 1, wherein said projection and the cut-out are located laterally spaced from a row of film-transporting perforations in the film.

7. A roll film cassette as defined in claim 1, wherein said projections and the cut-out have dimensions which are larger than those of film-transporting perforations provided in the film.

* * * * *